(12) United States Patent
Söderlund et al.

(10) Patent No.: US 10,714,220 B2
(45) Date of Patent: Jul. 14, 2020

(54) FUEL CHANNEL FOR A NUCLEAR BOILING WATER REACTOR

(71) Applicant: Westinghouse Electric Sweden AB, Västerås (SE)

(72) Inventors: Anders Söderlund, Surahammar (SE); Markus Månsson, Västerås (SE)

(73) Assignee: Westinghouse Electric Sweden AB, Västerås (SE)

( * ) Notice: Subject to any disclaimer, the term of this patent is extended or adjusted under 35 U.S.C. 154(b) by 152 days.

(21) Appl. No.: 15/555,832

(22) PCT Filed: Mar. 13, 2015

(86) PCT No.: PCT/EP2015/055338
§ 371 (c)(1),
(2) Date: Sep. 5, 2017

(87) PCT Pub. No.: WO2016/146149
PCT Pub. Date: Sep. 22, 2016

(65) Prior Publication Data
US 2018/0047466 A1    Feb. 15, 2018

(51) Int. Cl.
*G21C 3/324*    (2006.01)
*G21C 21/00*    (2006.01)
*G21C 3/322*    (2006.01)

(52) U.S. Cl.
CPC .............. *G21C 3/324* (2013.01); *G21C 21/00* (2013.01); *G21C 3/322* (2013.01); *Y02E 30/40* (2013.01)

(58) Field of Classification Search
CPC ......... G21C 3/324; G21C 21/00; G21C 3/322
(Continued)

(56) References Cited

U.S. PATENT DOCUMENTS 3,715,274 A    2/1973    Venier et al.
4,749,543 A    6/1988    Crowther et al.
(Continued)

FOREIGN PATENT DOCUMENTS

DE    69716188 T2    10/2002
EP    0820066 B1    10/2002
(Continued)

OTHER PUBLICATIONS

Notice of Reasons for Rejection issued in corresponding Japanese Patent Application No. 2017-544910, dated Nov. 27, 2018, pp. 1-3.
(Continued)

*Primary Examiner* — Jack W Keith
*Assistant Examiner* — Daniel Wasil
(74) *Attorney, Agent, or Firm* — Murtha Cullina LLP

(57) ABSTRACT

A method of making a fuel channel for a fuel assembly for a nuclear power boiling water reactor. The method includes providing at least one first sheet of a Zr-based material of a first thickness, and providing at least one second sheet of a Zr-based material of a second thickness which is less than said first thickness. It also includes assembling at least said at least one first sheet and said at least one second sheet, such that a fuel channel is formed and such that said at least one first sheet forms a lower part of the fuel channel. The at least one second sheet forms a higher part of the fuel channel and the lower part is joined with said higher part. The lower part constitutes 20-75% of the length of the fuel channel.

16 Claims, 3 Drawing Sheets

(58) Field of Classification Search
USPC .................................. 376/409, 434, 457, 260
See application file for complete search history.

(56) References Cited

U.S. PATENT DOCUMENTS

| | | | |
|---|---|---|---|
| 4,970,047 A | | 11/1990 | Ueda et al. |
| 5,265,139 A | * | 11/1993 | Yanagi .................. G21C 3/324 |
| | | | 376/435 |
| 5,304,261 A | * | 4/1994 | Yamamoto ............ G21C 3/324 |
| | | | 148/519 |
| 2006/0144484 A1 | | 7/2006 | Dahlback |

FOREIGN PATENT DOCUMENTS

| | | | |
|---|---|---|---|
| JP | 53-43193 | | 4/1978 |
| JP | S5555284 A | | 4/1980 |
| JP | H01227991 A | * | 9/1989 |
| JP | 2-216087 | | 8/1990 |
| JP | H02216087 A | | 8/1990 |
| JP | H08146176 | | 6/1996 |
| JP | H1048373 A | * | 2/1998 |

OTHER PUBLICATIONS

International Search Report issued in corresponding application No. PCT/EP2015/055338, dated Jun. 1, 2015, pp. 1-2.
International Preliminary Report on Patentability for corresponding PCT/EP2015/055338 dated Sep. 19, 2017.

* cited by examiner

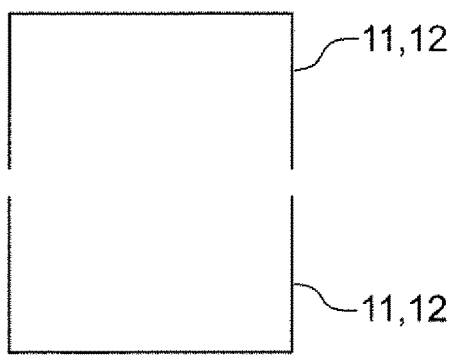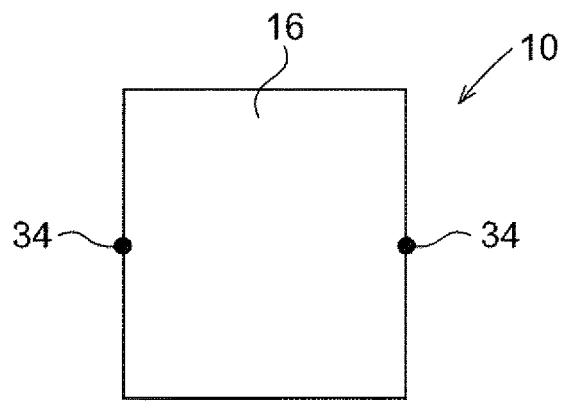
Fig. 4　　　　　　　　Fig. 5
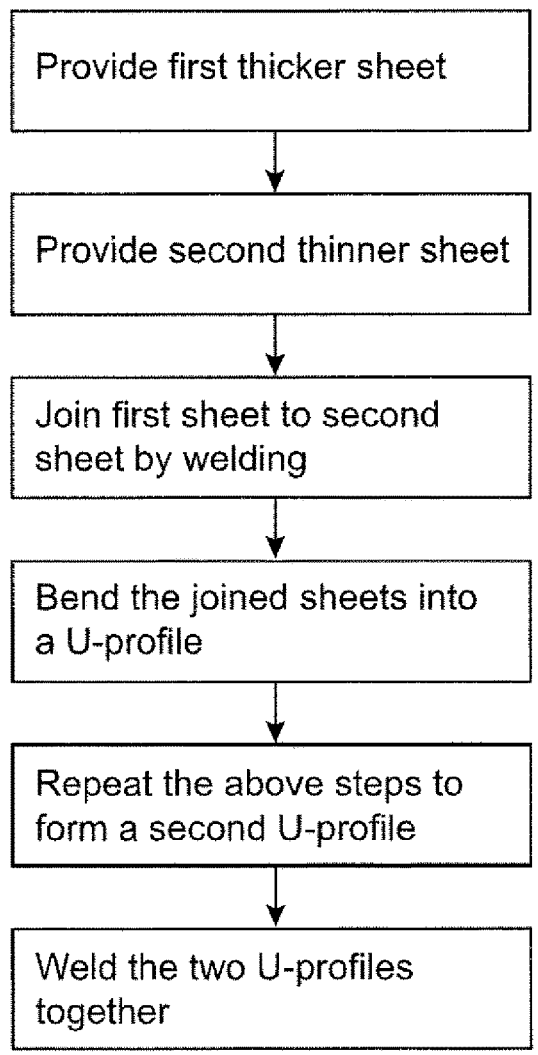
Fig. 6

FUEL CHANNEL FOR A NUCLEAR BOILING WATER REACTOR

FIELD

The present invention relates to a method of making a fuel channel for a fuel assembly for a nuclear power boiling water reactor. The invention also concerns a fuel channel as such and a fuel assembly for a nuclear power boiling water reactor.

BACKGROUND

In a fuel assembly for a nuclear power boiling water reactor (BWR), there are a number of fuel rods, which comprise a nuclear fuel material. The bundle of fuel rods are surrounded by a fuel channel, which forms a surrounding wall of the fuel assembly. When the fuel assembly is in operation in a nuclear reactor, a cooling medium, usually water, flows up through the fuel assembly. This water fulfils several functions. It functions as a cooling medium for cooling the fuel rods such that they will not be overheated. The water also serves as a neutron moderator, i.e. the water slows down the neutrons to a lower speed. Thereby, the reactivity of the reactor is increased.

Since the water flows upwards through the fuel assembly, in the upper part of the fuel assembly, the water has been heated to a larger extent. This has as a consequence that the portion of steam is larger in the upper part of the fuel assembly than in the lower part.

The internal pressure in the fuel channel during operation is higher in the lower part of the fuel channel than in the upper part of the fuel channel. It is known to produce a fuel channel which has a varying thickness. The thinner parts of the fuel channel are often obtained by some kind of working, where material is removed from the fuel channel wall, for example by milling.

U.S. 2006/0144484 A1 describes a method of producing a fuel channel. FIGS. 4 and 5 in this document show that first two U-shaped profiles are produced, which profiles then are welded together such that the fuel channel is formed.

U.S. Pat. No. 4,749,543 describes a fuel channel with a varying thickness.

U.S. Pat. No. 4,970,047 describes a fuel channel with a varying thickness, obtained by stepwisely shaving the inner surface of the channel box (see abstract).

DE 697 16 188 T2, JP 2-216087 and JP 53-43193 also show fuel channels with a varying thickness.

SUMMARY OF THE INVENTION

An object of the present invention is to provide an improved method of making a fuel channel for a fuel assembly for a nuclear power boiling water reactor. An object thereby is to simplify the production of the fuel channel. A further object is to use less material when producing the fuel channel. A further object is to make it possible to optimize the performance of the fuel channel in a simple manner. Another object is to save costs for producing the fuel channel.

The above objects are achieved by a fuel assembly as defined in a method of making a fuel channel for a fuel assembly for a nuclear power boiling water reactor, the fuel channel defining a length direction which in use corresponds substantially to the vertical direction, the method comprising:

providing at least one first sheet of a Zr-based material, said at least one first sheet having a first thickness, providing at least one second sheet of a Zr-based material, said at least one second sheet having a second thickness, wherein said second thickness is less than said first thickness, assembling different elements which together are to form the fuel channel, which elements comprise said at least one first sheet and said at least one second sheet, such that a fuel channel is formed and such that said at least one first sheet forms a lower part of the fuel channel and such that said at least one second sheet forms a higher part of the fuel channel and such that said lower part is joined with said higher part in that said at least one first sheet is joined with said at least one second sheet, wherein the joint between said lower part and said higher part is located such that the lower part constitutes 20-75% of the length of the fuel channel.

Since the fuel channel is made of at least a first sheet and a second sheet of different thickness, which are joined with each other, the fuel channel can be made in a simple manner. It is, for example, not necessary to remove material by milling, in order to vary the thickness of the fuel channel. Furthermore, since a thinner sheet is connected with a thicker sheet, material is saved, compared to the case when the fuel channel has a constant thickness or the case where material is removed by for example milling. Since a higher part of the fuel channel is made by the thinner sheet, it is possible to optimize the performance of the fuel channel. For example, the second, thinner, sheet can be arranged such that the inner cross sectional area of the fuel channel is larger in the upper part of the fuel channel. This will contribute to a decrease in the pressure drop in the upper part of the fuel channel. Moreover, since the fuel channel has a lower thicker part, which is relatively long, it is well adapted to the higher pressure which during operation is the case in the lower part. Furthermore, since the fuel channel according to the invention is produced in a simple manner, such that also material is saved, the cost for producing the fuel channel is reduced.

It can be noted that a fuel channel can also be called for example a box or box wall or channel wall.

The fuel channel is normally quite long (for example about 4 m) compared to its width (for example about 1.5 dm). It therefore has a length direction, which may be defined by a central longitudinal axis of the fuel channel.

In use in a nuclear reactor, the fuel assembly, and the fuel channel, preferably extend mainly in the vertical direction. The length direction is thus, in use, the vertical direction. The concepts "lower" and "higher", and similar expressions, are used in order to refer to different parts of the fuel channel, as seen when the fuel channel is positioned in the intended use position.

The nuclear reactor is preferably a light water reactor.

The concepts "first" and "second", etcetera are used to distinguish the different parts from each other and should therefore not be seen to designate a certain number of parts. For example, it is possible that there are several "first sheets" that together form the lower part of the fuel assembly.

Zr-based material means that the material to a large extent consists of Zr, the Zr content (in weight percent) may be at least 94%, preferably at least 97%. The Zr-based material can be an alloy, which is designed for use in a nuclear BWR, for example an alloy such as Zircaloy 2 or Zircaloy 4, or modifications of such alloys, or any other Zr-based alloy suitable for use in a nuclear BWR.

Preferably, the at least one first sheet has a constant thickness, and the at least one second sheet has a constant thickness, and the assembled fuel channel has a constant first thickness where the at least one first sheet is located (except for possible small local deviations, for example caused by deformation when bending the sheets) and a constant second thickness where the at least one second sheet is located (except for possible small local deviations, for example caused by deformation when bending the sheets).

According to one embodiment of the method according to the invention, said higher part constitutes 20-75% of the length of the fuel channel, preferably 30-50% of the length of the fuel channel. Such a length of the higher part has been found to be suitable, since such a higher part is suitable to be positioned where the internal pressure in the fuel channel, during operation, is lower than in the lower part of the fuel channel. It is therefore sufficient to use a thinner sheet for such higher part.

Preferably, said lower part and said higher part together form at least 60% of the length of the fuel channel, preferably at least 90%, most preferred 100% of the length of the fuel channel (the fuel channel is the wall, which in use surrounds the (bundle(s) of) fuel rods of a fuel assembly). It is within the scope of the invention that the fuel channel comprises some further parts, in addition to said lower part and said higher part. For example, there may be a second higher part, which is made of at least one third sheet which has a third thickness which is less than said second thickness, wherein said at least one third sheet forms a second higher part of the fuel channel, located above said (first) higher part, and such that said (first) higher part is joined with said second higher part in that said at least one second sheet is joined with said at least one third sheet. Similarly, there may be a second lower part, which is located below the (first) lower part, and which is made of a sheet which is thicker than said first sheet. With such further parts, the thickness of the fuel channel can be adapted to the requirements in different parts of the fuel assembly.

According to a further embodiment of the method according to the invention, said second thickness is 40-85% of said first thickness, preferably 55-80% of said first thickness. Such a thickness has been found to be suitable in order to provide sufficient strength and at the same time make the second sheet sufficiently thin in order to provide more space for water or steam (compared to the case if the second thickness were the same as the first thickness), and in order to reduce the amount of used material.

According to a further embodiment of the method, said first thickness is 2.00-3.50 mm, preferably 2.00-3.00 mm, more preferred 2.20-2.80 mm. Such a thickness has been found to be appropriate in order to provide sufficient strength for the lower part where the first sheet is positioned, at the same time as it is avoided to use an unnecessarily thick sheet.

According to a further embodiment of the method, the joint between said lower part and said higher part is formed by welding or soldering, preferably by welding. In particular by using welding, the fuel channel can be produced in a simple and efficient manner and such a joint also provides sufficient strength.

The welding may for example be TIG welding, but also other welding methods may be used. The weld joint may for example be formed by butt welding.

According to a further embodiment of the method, the assembling step is carried out such that the formed fuel channel has a cross sectional inner area in the higher part, which is larger than the cross sectional inner area in the lower part. By providing a larger inner area in the higher part, there is more space in the higher part. During operation, the higher part of the fuel assembly contains a large amount of steam. By providing more area in the higher part, the pressure drop in the water decreases. The water in the higher part can thereby flow in a more efficient manner through the fuel assembly.

The inner area is thus the area inside the fuel channel, limited by the inside of the walls of the fuel channel, which walls are formed at least by said at least first and second sheets. The cross section is thus a horizontal section, if the fuel channel is seen in the intended use position, in which it extends vertically. The cross sectional inner area in the higher part may for example be 0.7-4.0%, preferably 1.0-4.0%, more preferred 1.5-3.0%, larger than the cross sectional inner area in the lower part.

The fuel channel preferably has a rectangular cross sectional shape, more preferred a square cross sectional shape. The inner distance between two opposite sides in the higher part is preferably at least 0.50 mm larger, preferably at least 0.80 mm larger, more preferred at least 1.30 mm larger, than the inner distance between two opposite sides in the lower part.

According to a further embodiment of the method, the assembling step is carried out such that the formed fuel channel has an outer cross sectional area in the higher part, which is the same, or at least substantially the same, as the outer cross sectional area in the lower part. In this manner, a smooth external surface is obtained at the same time as the internal cross sectional area in the higher part is made large.

The outer cross sectional area is thus the area enclosed by the outside of the walls of the fuel channel, which walls are formed by said at least first and second sheets.

By "substantially the same" is here meant that the outer cross sectional area in the higher part differs less than 0.50%, from the outer cross sectional area in the lower part. Preferably, this difference is less than 0.25%, more preferred the difference is 0.

As mentioned above, the fuel channel preferably has a rectangular cross sectional shape, more preferred a square cross sectional shape. In this case, if the outer cross sectional area in the higher part is at least substantially the same, as the outer cross sectional area in the lower part, the difference between the distance between two opposite outer sides in the higher part and the distance between two opposite outer sides in the lower part is preferably less than 0.5 mm, more preferred less than 0.4 mm, most preferred 0.0 mm.

According to an alternative embodiment, the assembling step is carried out such that the formed fuel channel has an outer cross sectional area in the higher part, which is less than the outer cross sectional area in the lower part. By having a smaller outer cross sectional area in the higher part, the water which, in operation, surrounds the fuel assembly will get closer to the fuel rods positioned in the fuel assembly. This leads to an improved moderation of the fuel rods. In this embodiment, the outer cross sectional area in the lower part may be for example 0.6-4.0%, preferably 1.0-4.0%, more preferred 1.5-3.0% larger than the outer cross sectional area in the upper part. If the fuel channel has a rectangular cross sectional shape, in particular a square cross sectional shape, the distance between two opposite outer sides in the lower part is preferably at least 0.60 mm larger, more preferred at least 0.80 mm larger, most preferred at least 1.30 mm larger, than the distance between two opposite outer sides in the upper part. According to this embodiment, the cross sectional inner area in the higher part may either be the same (or at least substantially the same) as, or larger than, the cross sectional inner area in the lower part. If the cross sectional inner area in the higher part is the same as the cross sectional inner area in the lower part, it is possible for example to use the same dimensions for the spacer grids that are positioned in the higher part and in the lower part.

According to a further embodiment of the method, said at least one first sheet is joined with said at least one second sheet when the sheets are flat, after which the joined sheets are configured and arranged, possibly together with other elements, such that the fuel channel, which surrounds an inner space, is formed. It has been found that it is easy to join the sheets to each other when the sheets are flat. This embodiment therefore provides a simple manner of joining the sheets.

According to an alternative manner, the at least one first sheet is formed into a lower part of the fuel assembly, which surrounds an inner space, and the at least one second sheet is formed into a higher part of the fuel assembly, which surrounds an inner space, after which the so formed lower and higher parts are joined with each other.

The invention also concerns a fuel channel for a fuel assembly for a nuclear power boiling water reactor. The fuel channel defines a length direction which in use corresponds substantially to the vertical direction. The fuel channel comprises:

at least one first sheet of a Zr-based material, said at least one first sheet having a first thickness, at least one second sheet of a Zr-based material, said at least one second sheet having a second thickness, wherein said second thickness is less than said first thickness, said at least one first sheet and said at least one second sheet being shaped and arranged, such that they, together with possible further elements, form said fuel channel, wherein said at least one first sheet forms a lower part of the fuel channel and said at least one second sheet forms a higher part of the fuel channel, said at least one first sheet having been joined with said at least one second sheet such that a formed joint is arranged where said at least one first sheet has been joined with said at least one second sheet, wherein said joint also forms a joint between said lower part and said higher part, wherein the joint between said lower part and said higher part is located such that the lower part constitutes 20-75% of the length of the fuel channel.

Such a fuel channel has advantageous properties corresponding to those mentioned above, in connection with the method of making the fuel channel.

Further embodiments of the fuel channel are defined in the dependent claims, and have advantages corresponding to those mentioned above in connection with the embodiments of the method according to the invention.

The invention also concerns a fuel assembly for a nuclear power boiling water reactor. The fuel assembly comprises:

a plurality of fuel rods arranged substantially parallel to each other, said fuel rods comprising nuclear fuel material, a plurality of spacer grids arranged to hold the fuel rods at predetermined positions relative to each other, a fuel channel as described above, arranged such it surrounds said fuel rods and said spacer grids.

Such a fuel assembly has advantageous properties, as explained above in connection with the fuel channel and the method of making the fuel channel.

BRIEF DESCRIPTION OF THE DRAWINGS

FIG. 4 shows schematically a cross section of two profiles which are to be joined to form a fuel channel.

FIG. 5 shows schematically the same cross section as FIG. 4 of the profiles after that they have been joined to each other.

FIG. 6 shows schematically a flow chart of an embodiment of a method according to the invention.

DESCRIPTION OF EMBODIMENTS OF THE INVENTION

An embodiment of a fuel assembly according to the invention will now be described, first with reference to FIGS. 1 and 2.

Figure 1:
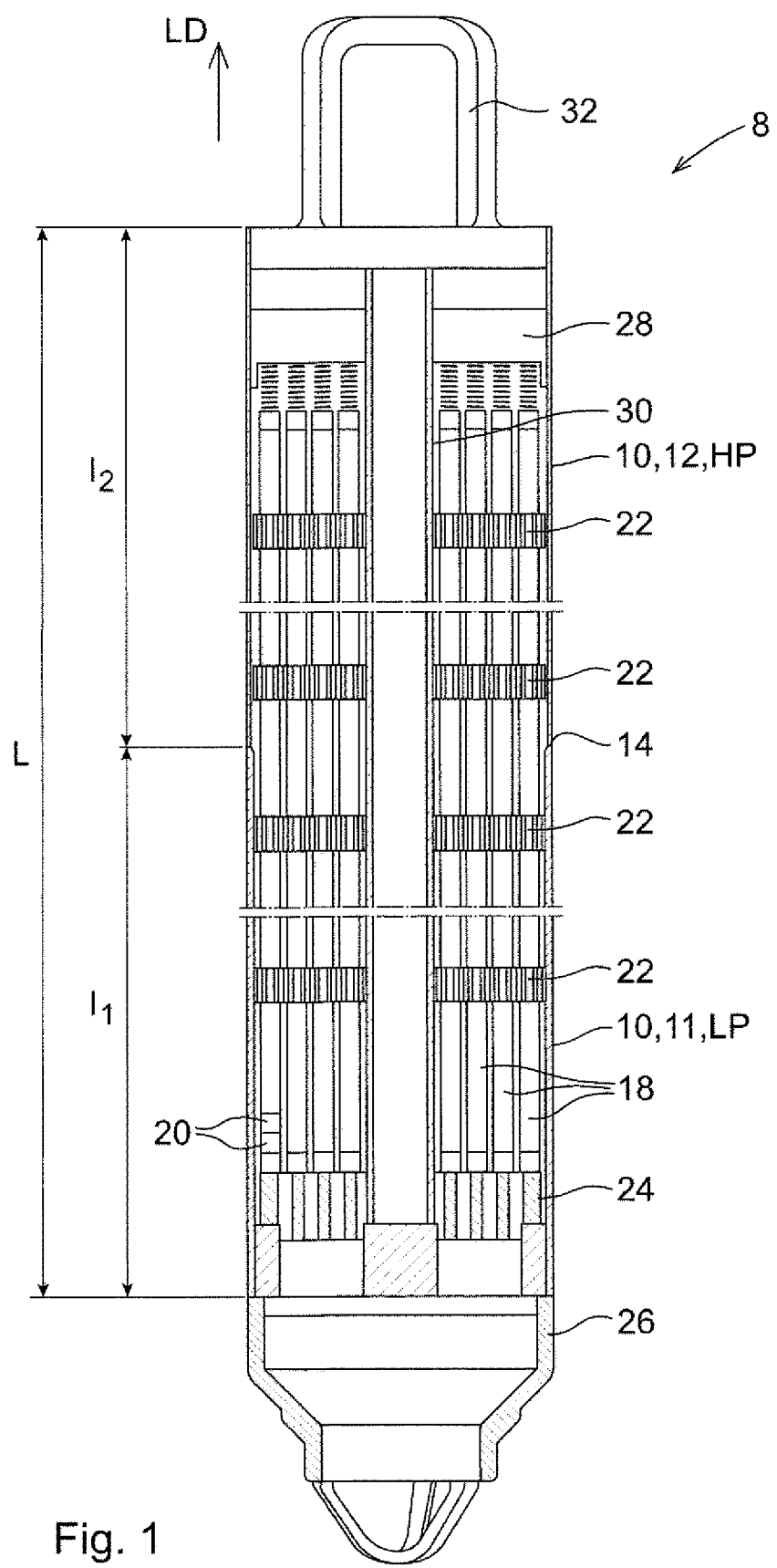
FIG. 1 shows schematically a sectional side view of an embodiment of a fuel assembly according to the invention.

FIG. 1 shows schematically a fuel assembly 8 for a nuclear power boiling water reactor (BWR). The fuel assembly 8 comprises a plurality of fuel rods 18. The fuel rods 18 are arranged substantially parallel to each other and they extend substantially in the length direction LD of the fuel assembly 8. The fuel rods 18 comprise nuclear fuel material 20 (just indicated as a few fuel pellets for one of the fuel rods 18). A plurality of spacer grids 22 are arranged to hold the fuel rods 18 at predetermined positions relative to each other. A fuel channel 10 is arranged such that it surrounds the fuel rods 18 and the spacer grids 22.

The fuel assembly 8 also comprises a bottom plate 24 and a top plate 28, between which the fuel rods 18 are arranged. The fuel assembly 8 also comprises a lower transition piece 26, which forms an inlet for the cooling medium, i.e. the water, which in use flows through the fuel assembly 8.

The fuel assembly also comprises one or more water channels 30, through which non-boiling water can flow. At the top of the fuel assembly 8 a handle 32 is arranged in order to facilitate the transportation of the fuel assembly 8.

It should be noted that FIG. 1 only shows one possible embodiment of a fuel assembly according to the invention. Other designs of the fuel assembly are also possible. For example, the fuel assembly does not need to have a top plate and bottom plate of the kind shown in FIG. 1. For example, according to an alternative embodiment, the fuel assembly does not have any top plate 28 as shown in FIG. 1. Instead, the fuel rods 18 are held in position by the spacer grids 22, and the whole fuel assembly may be held together by for example one or more water channels (for non-boiling water) which extend to an upper lifting device, or by support elements (for example support rods) which, at one end, are attached to the water channel(s) and at the other end are attached to an upper lifting device.

The fuel channel 10 shown in FIG. 1 (which fuel channel 10 illustrates an embodiment of a fuel channel according to the invention) comprises at least one first sheet 11 of a Zr-based material. The first sheet 11 has a first thickness T. One or more such first sheets 11 form a lower part LP of the fuel channel.

The fuel channel 10 also comprises at least one second sheet 12 of a Zr-based material. The second sheet 12 has a second thickness t. The second thickness t is less than the first thickness T. One or more of said second sheets 12 form a higher part HP of the fuel channel 10.

The one or more first sheets 11 and the one or more second sheets 12 are joined to each other by welding such that a weld joint 14 is formed. The weld joint 14 can for example be formed by TIG welding. The weld joint 14 is thus arranged where the at least one first sheet 11 has been joined with the at least one second sheet 12. The weld joint 14 therefore also forms a joint between the mentioned lower part LP and the higher part HP.

The thickness T of the first sheet(s) 11 can be for example 2.50 mm. The thickness t of the second sheet(s) 12 can be for example 1.60 mm.

According to the embodiment shown in FIG. 1, the whole fuel channel 10 is made of sheets of the two different thicknesses described. However, as explained above, it is within the scope of the present invention that there are further sections of the fuel channel, with further thicknesses of the sheets that make up the fuel channel.

The fuel channel 10 has a length L, which may for example be 4.0 m. The lower part LP, which is made of the sheet(s) 11 of the first thickness T has a length $l_1$. The higher part HP, which is made of the sheet(s) 12 of the second thickness t has a length $l_2$. $l_1$ may for example be 1.6 m and $l_2$ may be for example 2.4 m.

Figure 2:
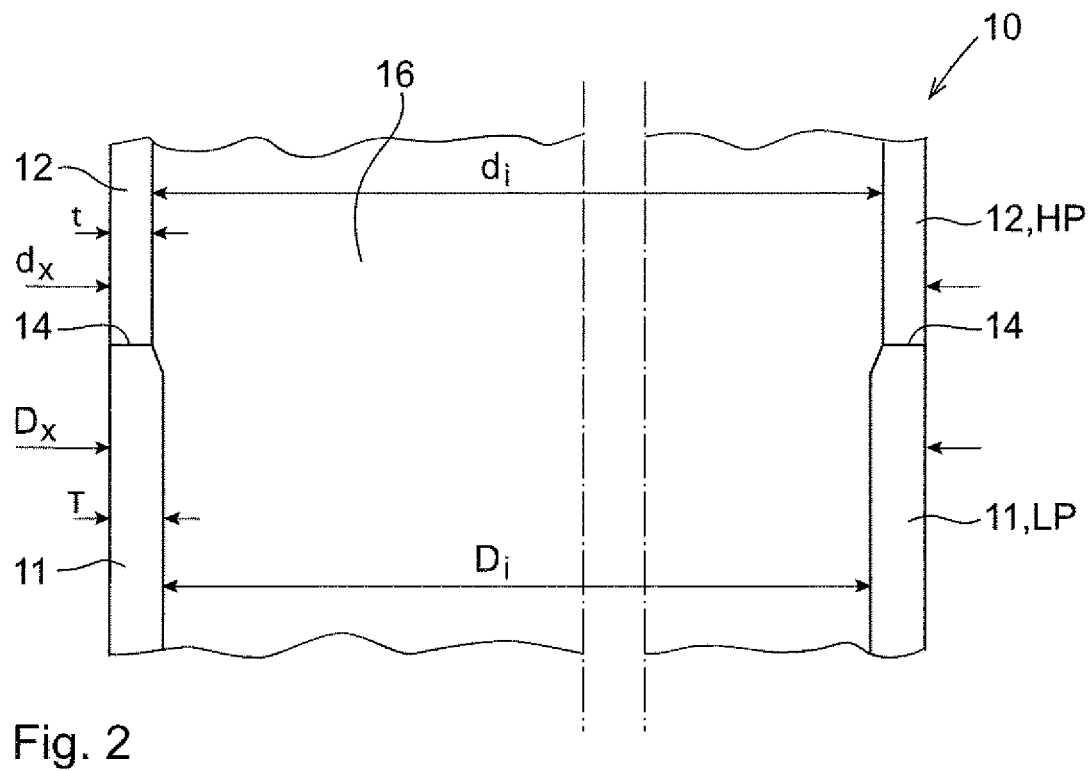
FIG. 2 shows schematically a sectional side view of the fuel channel shown in FIG. 1 in the area where the first and second sheets are joined.

In the embodiment shown in FIG. 1 and FIG. 2, the fuel channel 10 has a cross sectional inner area in the higher part HP which is larger than the cross sectional inner area in the lower part LP. The outer cross sectional area in the higher part HP is the same as the outer cross sectional area in the lower part LP.

The fuel channel 10 may have a square cross sectional shape. FIG. 2 shows schematically a sectional side view of such a fuel channel 10. The distance $D_x$ between two opposite outer sides in the lower part LP may be for example 140 mm. The distance between two opposite outer sides in the higher part HP is indicated with $d_x$ in FIG. 2. According to this embodiment, $D_x$ is thus equal to $d_x$.

According to this embodiment, the inner distance $D_i$ between two opposite sides in the lower part LP may be 135 mm. The inner distance $d_i$ between two opposite sides in the higher part HP may, according to this embodiment, be 136.8 mm.

Figure 3:
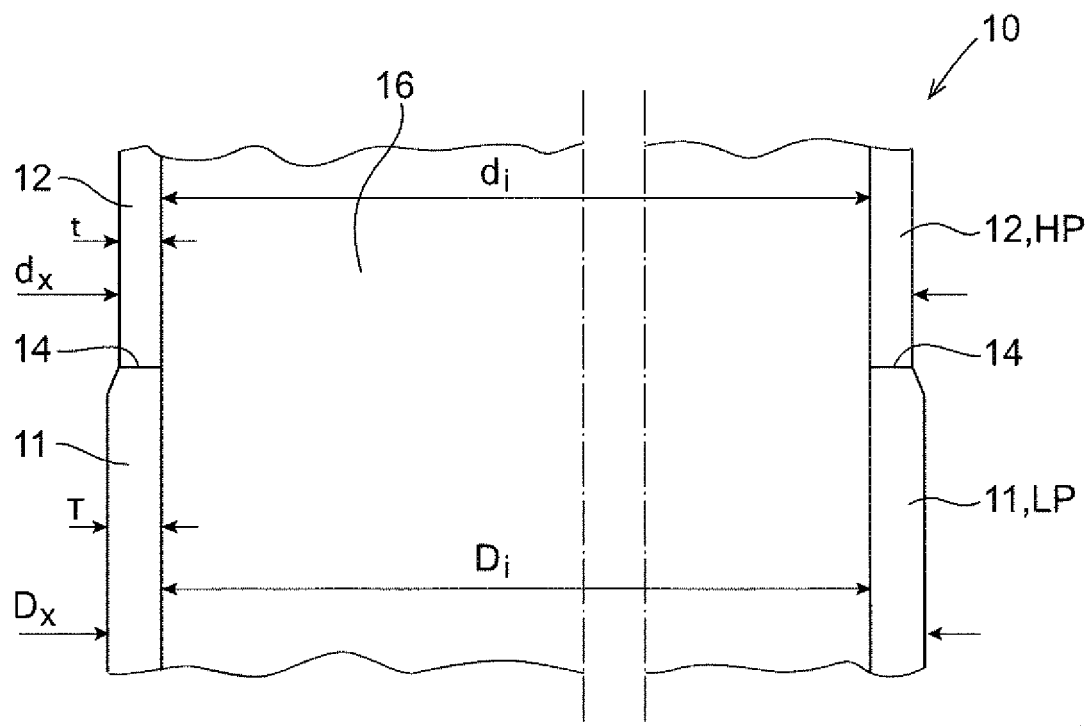
FIG. 3 shows a schematic view, similar to the view of FIG. 2, of the fuel channel according to another embodiment of the fuel channel.

FIG. 3 shows the same view as FIG. 2 of another embodiment of a fuel channel 10 according to the invention. According to this embodiment, the fuel channel 10 has a constant inner cross sectional area. The fuel channel 10 has, also according to this embodiment, a square cross sectional shape. The distance $D_x$ between two opposite outer sides in the lower part LP may also in this embodiment be for example 140 mm. The inner distance $D_i$ between two opposite sides in the lower part LP may be 135 mm. According to this embodiment, the inner distance $d_i$ between two opposite sides in the higher part HP is thus also 135 mm. The distance $d_x$ between two opposite outer sides in the higher part HP may according to this embodiment be 138.2 mm.

According to a further embodiment (which is not shown in the figures), the design of the fuel channel 10 is intermediate between the embodiments shown in FIGS. 2 and 3. Also according to this embodiment, the fuel channel 10 may have a square cross sectional shape. The distance $D_x$ between two opposite outer sides in the lower part LP may also in this embodiment be for example 140 mm. The inner distance $D_i$ between two opposite sides in the lower part LP may be 135 mm. According to this embodiment, the inner distance $d_i$ between two opposite sides in the higher part HP may be 135.9 mm. The distance $d_x$ between two opposite outer sides in the higher part HP may according to this embodiment be 139.1 mm.

An embodiment of a method according to the invention will now be described with reference to the flow chart in FIG. 6 and also to FIGS. 4 and 5.

According to this embodiment, a first flat sheet 11 of a Zr-based material is provided. The first sheet 11 has a first thickness T.

A second flat sheet 12 of the same Zr-based material is provided. The second sheet 12 has a second thickness t which is less than T. The sheets are joined to each other by welding. A first flat combined sheet 11, 12 is thus obtained.

The above steps are repeated in order to form a second such combined sheet 11, 12. The first combined sheet is shaped into a U-profile as shown in the upper part of FIG. 4. The second combined sheet is also shaped into a U-profile as shown in the lower part of FIG. 4. These two U-profiles are then joined by welding as indicated in FIG. 5. Two weld joints 34 are thus produced, which extend in the length direction LD of the fuel channel 10 (and of the fuel assembly 8 when the fuel channel 10 is a part of a fuel assembly 8). The fuel channel 10 forms an inner space 16.

The dimensions of the different parts are for example selected as indicated above in the embodiment of the fuel channel 10 and the fuel assembly 8. The formed fuel channel 10 may thus for example have a cross sectional inner area in the higher part HP which is larger than the cross sectional inner area in the lower part LP. The outer cross sectional area in the higher part HP may for example be the same as the outer cross sectional area in the lower part LP.

As indicated above, there are other manners of making a fuel channel 10 according to the invention. It is thus for example possible to first form two U-profiles of first sheets 11 of a first thickness T and then join these two U-profiles together. After this, another two U-profiles are formed of second sheets 12 of a second thickness t and these U-profiles are joined together. In this manner one fuel channel section, which is to form a lower part LP, is formed and one fuel channel section, which is to form a higher part HP, is formed. After this, these two sections are joined to each other by welding, i.e. the joint 14 is formed.

The present invention is not limited to the examples described herein, but can be varied and modified within the scope of the following claims.

The invention claimed is:

1. A method of making a fuel channel for a fuel assembly for a nuclear power boiling water reactor, the fuel channel defining a length direction which in use corresponds substantially to the vertical direction, the method comprising:
    providing at least one first sheet of a Zr-based material, said at least one first sheet having a first thickness, wherein said first thickness is constant throughout each first sheet,
    providing at least one second sheet of a Zr-based material, said at least one second sheet having a second thickness, wherein said second thickness is constant throughout each second sheet and said second thickness is less than said first thickness,
    assembling different elements which together form the fuel channel, which elements comprise said at least one first sheet and said at least one second sheet, wherein a fuel channel is formed and said at least one first sheet forms a lower part of the fuel channel and said at least one second sheet forms a higher part of the fuel channel and said lower part is joined with said higher part in that said at least one first sheet is joined with said at least one second sheet, wherein the formed fuel channel has a first cross sectional inner area in the higher part, the first cross sectional inner area is larger than a second cross sectional inner area in the lower part, wherein a joint is located between said lower part and said higher part wherein the lower part constitutes 20-75% of the length of the fuel channel.

2. A method according to claim 1, wherein said higher part constitutes 20-75% of the length of the fuel channel.

3. A method according to claim 1, wherein said second thickness is 40-85% of said first thickness.

4. A method according to claim 1, wherein said first thickness is 2.00-3.50 mm.

5. A method according to claim 1, wherein the joint between said lower part and said higher part is formed by one of welding or soldering.

6. A method according to claim 1, wherein the formed fuel channel has an outer cross sectional area in the higher part, which is at least substantially the same as an outer cross sectional area in the lower part.

7. A method according to claim 1, wherein the formed fuel channel has an outer cross sectional area in the higher part, which is less than the outer cross sectional area in the lower part.

8. A method according to claim 1, wherein said at least one first sheet is joined with said at least one second sheet when the sheets are flat, after which the joined sheets are configured and arranged to form the fuel channel, which surrounds an inner space.

9. A fuel channel for a fuel assembly for a nuclear power boiling water reactor, the fuel channel defining a length direction which in use corresponds substantially to the vertical direction, wherein the fuel channel comprises:
at least one first sheet of a Zr-based material, said at least one first sheet having a first thickness, wherein said first thickness is constant throughout each first sheet;
at least one second sheet of a Zr-based material, said at least one second sheet having a second thickness, wherein said second thickness is constant throughout each second sheet and said second thickness is less than said first thickness; and
said at least one first sheet and said at least one second sheet being shaped to form said fuel channel, wherein said at least one first sheet forms a lower part of the fuel channel and said at least one second sheet forms a higher part of the fuel channel, said at least one first sheet joined with said at least one second sheet to form a joint arranged where said at least one first sheet has been joined with said at least one second sheet, wherein said joint also forms a joint between said lower part and said higher part,
wherein the fuel channel has a first cross sectional inner area in the higher part, the first cross sectional inner area is larger than a second cross sectional inner area in the lower part,
wherein the joint is located between said lower part and said higher part wherein the lower part constitutes 20-75% of the length of the fuel channel.

10. A fuel channel according to claim 9, wherein said higher part constitutes 20-75% of the length of the fuel channel.

11. A fuel channel according to claim 9, wherein said second thickness is 40-85% of said first thickness.

12. A fuel channel according to claim 9, wherein said first thickness is 2.00-3.50 mm.

13. A fuel channel according to claim 9, wherein the joint between said lower part and said higher part is one of a weld joint or soldering joint.

14. A fuel channel according to claim 9, wherein the fuel channel has an outer cross sectional area in the higher part, which is at least substantially the same as the outer cross sectional area in the lower part.

15. A fuel channel according to claim 9, wherein the fuel channel has an outer cross sectional area in the higher part, which is less than the outer cross sectional area in the lower part.

16. A fuel assembly for a nuclear power boiling water reactor, comprising:
a plurality of fuel rods arranged substantially parallel to each other, said fuel rods comprising nuclear fuel material,
a plurality of spacer grids arranged to hold the fuel rods at predetermined positions relative to each other, and
a fuel channel according to claim 9, arranged to surround said fuel rods and said spacer grids.

* * * * *